Dec. 8, 1931.  C. EHRET  1,835,852
SCALE
Filed Feb. 23, 1927   3 Sheets-Sheet 1
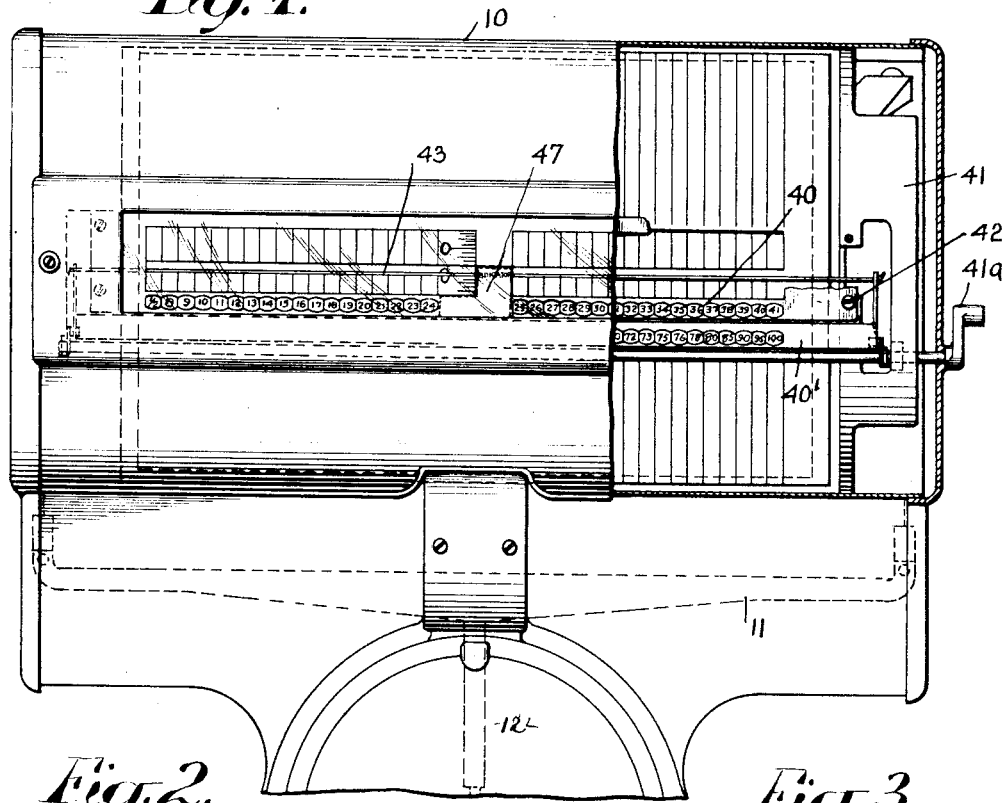
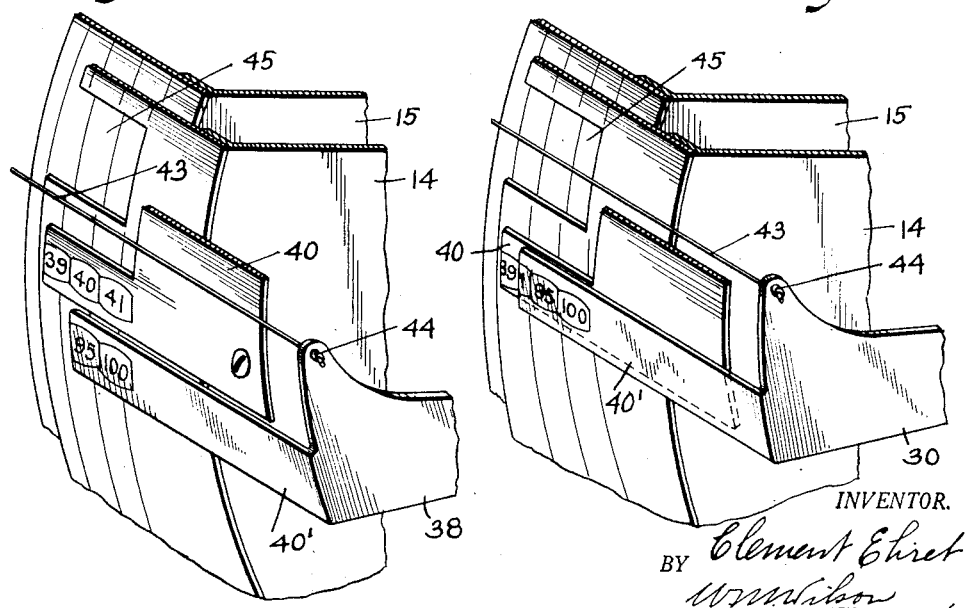
INVENTOR.
BY Clement Ehret
   WM Wilson
       ATTORNEYS.

Dec. 8, 1931.  C. EHRET  1,835,852
SCALE
Filed Feb. 23, 1927   3 Sheets-Sheet 2

INVENTOR.
Clement Ehret
BY
ATTORNEYS.

Dec. 8, 1931.    C. EHRET    1,835,852
SCALE
Filed Feb. 23, 1927    3 Sheets-Sheet 3

INVENTOR.
Clement Ehret
BY
W. M. Wilson
ATTORNEYS.

Patented Dec. 8, 1931

1,835,852

UNITED STATES PATENT OFFICE

CLEMENT EHRET, OF WHITE PLAINS, NEW YORK, ASSIGNOR TO DAYTON SCALE COMPANY, OF DAYTON, OHIO, A CORPORATION

SCALE

Application filed February 23, 1927. Serial No. 170,172.

This invention relates to certain new and useful improvements in weighing scales whereon the weight and selling price of a commodity may be ascertained at a glance without any mental calculation on the part of the person using the scale and also to a scale in which two rotary indicating drums are incorporated.

In computing scales of the drum type the drum is made as light as possible to minimize inertia and friction and generally consists of a series of light weight spiders which carry a cylindrical paper chart on their peripheries. This chart is graduated with a series of weight graduations and also carries a plurality of series of price graduations the price graduations corresponding to the different prices arranged side by side and a suitable fixed indicator being provided to indicate the prices per unit weight corresponding to each price graduation on the drum. The number of price graduations upon the drum and the number of prices per unit weight for which the device is adapted are limited primarily by the width of the drum and the size of the figures upon each price graduation chart. I prefer not to increase the width of the drum over the width now commonly used inasmuch as the weight and inertia of the drum would be so increased as to impair accurate weighing. It would also be undesirable to closer space the price graduations inasmuch as the legibility would be seriously impaired. It is therefore obvious that in many cases the use of two separate scales each having different price graduations and prices per unit weight have had to be used whereas one could have been used successfully if provided with the necessary price range.

In my invention I provide such a scale wherein a broad scope of price graduations and prices per unit weight may be incorporated. In the construction of my scale I have utilized two rotary drums, one drum revolving within the other and each drum cooperating with a different scale of prices per unit weight. For example, drum No. 1 would cooperate with a price per unit weight ranging from ½ cent to 41 cents per pound and drum No. 2 similarly cooperating with a price range from 42 cents to one dollar per pound. As an example, should a purchaser desire ten pounds of a commodity selling at 30 cents a pound the user of the scale would set the scale so that drum No. 1 would function cooperating with the price per unit weight indicator ranging from ½ cent to 41 cents. Drum No. 2 would be held against rotary motion by means which will be hereinafter described. Should another party desire ten pounds of a commodity retailing at 55 cents a pound the user of the scale would turn a handle fixed on the side of the drum structure in a counter-clockwise direction which would move the price per unit weight indicator into cooperation with the drum No. 2 there being an elongated aperture through drum No. 1 when in its normal position so that the inner drum may be easily read. I provide means whereby when the price per unit weight indicator corresponding to drum No. 2 is brought into position it rests on top or in other words covers the price per unit weight indicator corresponding to drum No. 1.

I also provide means whereby when the handle on the side of the scale structure is turned to set the price per unit weight indicator in alignment with drum No. 2 it automatically locks drum No. 1 against rotary motion and disconnects it from the weighing elements of the scale. It is obvious that with a structure of this kind that a broad range of price computations and prices per unit weight may be incorporated.

An object of the invention is to provide means whereby I may increase both the price computations and the prices per unit weight indications on a computing scale.

Another object is to increase the chart capacity of the scale without increasing the size of the chart portion of the scale.

Another object is to provide a scale embodying a plurality of indicating drums.

Another object is to provide a scale having a plurality of drums and means for selectively coupling the drums to the weighing apparatus.

Another object is to prevent changing from one chart to another while the scale is in weighing position.

Another object is to provide means whereby when one chart is brought into operation another will be locked out of operation.

Another object is to simultaneously render one chart visible and another invisible.

Another object is to provide a single index element for cooperation with a plurality of indicating charts.

Further objects and advantages will be more fully set forth in the accompanying specification and claims and shown in the drawings in which Fig. 1 is a front elevational view of a drum scale with parts of the casing broken away showing the prices per unit weight indicators fixed thereto.

Figs. 2 and 3 are fragmentary views showing the drums and price per unit weight indicator cooperating therewith.

Figure 4:
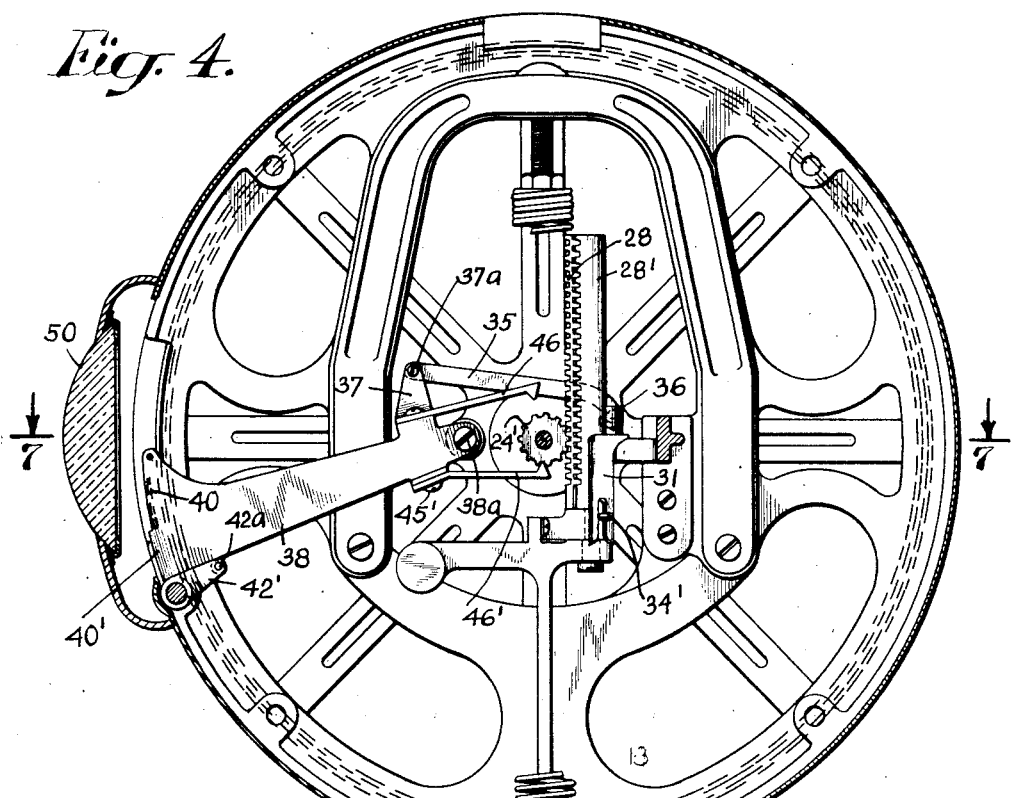
Fig. 4 is a sectional view of one end of my scale showing means for actuating the drums and also for holding them against rotation.
Figure 5:
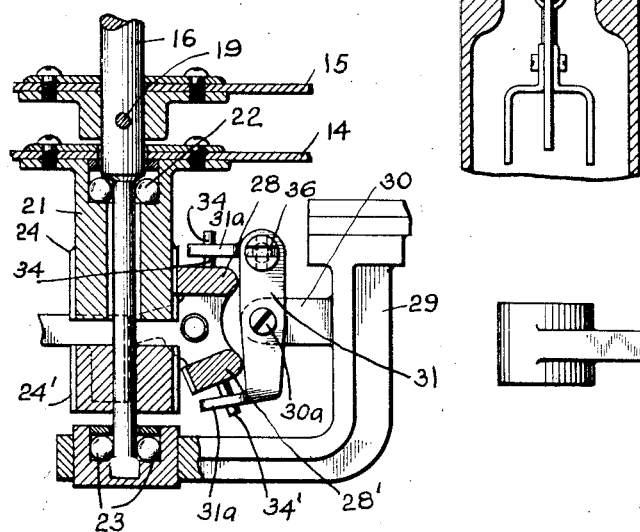
Fig. 5 is a sectional detail view showing the mounting of the drums and means for selectively bringing the drums into operation.
Figure 6:
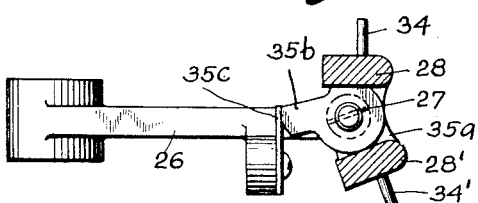
Fig. 6 is a sectional detail view showing means for maintaining the operating racks in either of a plurality of set positions.

The drawings show the invention as applied to a spring scale of the drum type, specifically to the scale shown in Patent No. 1,611,569, although it is to be understood that the invention may be used with either pendulum or spring scales of any suitable type. The details of the scale need not be set forth herein except as they pertain to the invention. For a more complete description of the scale, reference should be had to the above-mentioned patent. In general, the scale includes a casing 10, a draft bar 11 actuated downwardly upon placing of a load on the scale by a draft rod 12 (Fig. 1) connected to the platform levers (not shown). The draft bar 11 has at each end a connection to a load counter-balancing spring 13 (Fig. 4) and is also connected at each end to a vertical arm 5 of a rack-carrier 26, further referred to hereinafter and other well known elements which constitute a scale of this type. A plurality of concentric drums 14 and 15 (see Figs. 2, 3 and 7) are mounted on a shaft 16. The inner drum 15 has affixed thereto at 17 a collar or hub 18 which is rigidly fastened to the shaft by means of a pin or set screw 19 (see Figs. 5 and 7). Fixed to the outer drum 14 is a sleeve or hub 21. This hub is loosely mounted on the shaft 16 rotating upon radial and thrust bearings 22. This radial and thrust bearing prevents lateral movement of the outer drum 14 with respect to the inner drum 15 and with respect to the shaft 16 thereby eliminating friction between the two drums 14 and 15 so that either drum may be rotated. The shaft 16 is journalled at both ends in bearings 23 mounted in brackets 29. Integral with the hub 21 of the outer drum 14 is a pinion gear 24. Adjacent to the pinion gear 24 is another pinion gear 24' which is fixed on the shaft 16. Pivotally mounted on a counter balancing arm 26 at 27 (see Fig. 6) is a member 35a carrying a pair of racks 28 and 28', which coact with the aforementioned pinion gears 24 and 24'. As disclosed in Fig. 5 the rack 28 is shown as being in mesh with the pinion 24, the rack 28' being out of mesh with the pinion 24'. Fixed to the bracket 29 is an arm 30 which has pivotally mounted thereon at 30a a member 31, the opposite ends of which are bent downwardly as shown in Fig. 4 and are bifurcated as shown to straddle the pins 34 and 34' fixed to a member 35a to which are fixed the racks 28 and 28'. When the weighing platform is in its normal or zero position the pins 34 and 34' cooperate with member 31 as in Fig. 4 but when a weight is placed upon the platform the pins are disengaged so that the operating connection between the platform and drums cannot be changed. An arm 35 (see Figs. 4 and 7) having universal connection to the member 31 at 36 is adapted to turn the member 31 as will be hereinafter described. This mechanism will turn member 31 about its pivot 30a and through the depending bifurcated portions 31a cooperating with pins 34 and 34' will in turn swing member 35a about its axis thereby engaging one of the racks with its coacting pinion gear and disengaging the other rack. Fixed with respect to member 35a is an arm 35b (Fig. 6) having flat or straight edges cooperating with a spring 35c adapted to resiliently hold the member 35a in either position to which it may be adjusted. The arm 35 is pivoted at its other end to a member 37 at 37a integral with the arm 38 of the price per unit weight indicator 40' (see Fig. 4) so that when the arm 38 is raised or lowered the link 35 will be moved to the right or left to actuate the member 31.

Referring now to Figs. 1, 2 and 3 in which are disclosed the various price per unit weight indications 40 and 40' it will be noted that the price per unit weight indicator 40 which cooperates with the outer drum 14 is fixed to the frame 41 of the scale by means of a screw 42. It is, of course, to be understood that both ends of this price per unit weight indicator are fixed in the same manner. The price per unit weight-indicator 40' is situated beneath the price per unit weight indicator 40 and is moved into position to cooperate with the inner drum 15 by means of a crank 41a (see Figs. 1 and 7) which has affixed thereto an arm 42' carrying a roller stud 42a which cooperates with the price per unit weight indicator 40'. When the handle 41a is turned in a counter clockwise direction the roller stud 42a abuts the lower edge of the arm 38 of the price per unit weight indicator 40' thereby rocking it upwardly about its pivot 38a (see Figs. 4 and 8) moving it from the position shown in Figs. 2 and 4 to the position shown in Figs. 3 and 8. It will be noted that in the latter position that the price per unit weight indicator 40' covers the lower denominational price per unit weight indicator 40 so that the latter which is now out of use is invisible. It will also be noted that indicator 40' when in its lower or inoperative position is screened by the casing 10 so that only the indicator 40 which is in use is visible. Also when the price per unit weight indicator 40' is raised it moves a shutter 47 (Fig. 1) extending upwardly therefrom to cover up the zero on the outer drum 14 and also raises the designation "Indicator" with the index wire 43. This designation being applied to the upper portion of the shutter 47, it is not necessary to cover up the zero indication on the inner drum 15 when the outer drum 14 is being used by any such shutter arrangement, as the outer drum 14 itself will cover the inner drum 15 and the zero designation when it commences to rotate. In order that the readings on both drums may be easily read I have provided a magnifying glass 50 which is fixed to the scale in the well known manner. An indicating wire 43 for indicating the weight and price computations is fixed at its opposite ends to the price per unit weight indicator 40' as shown at 44 in Figs. 2 and 3. This indicating wire 43 when in its lower position cooperates with the outer drum 14 and the price per unit weight indicator scale 40 and when in its upper position cooperates with the inner drum 15 and the price per unit weight indicator scale 40'. An elongated aperture 45 (see Figs. 2 and 3) is provided in the outer drum 14 in order that the computations and weight indications on the inner drum 15 may be read.

Figure 7:
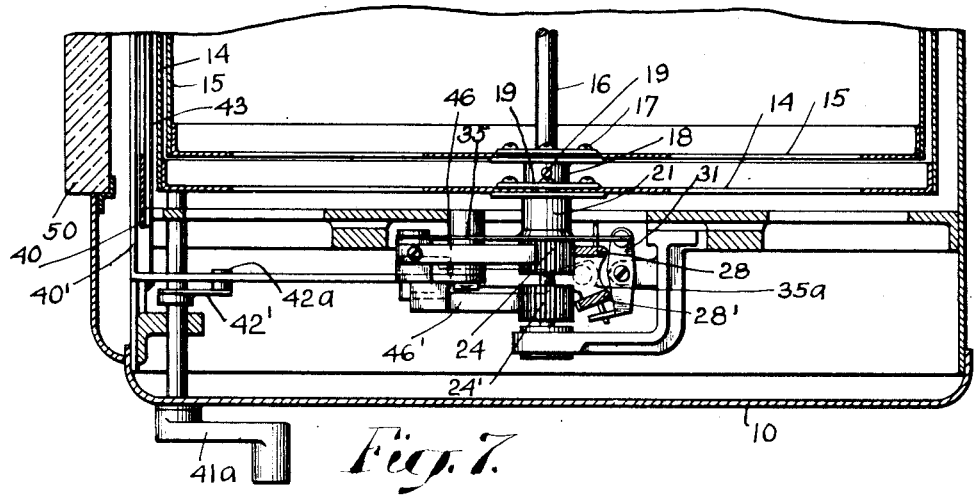
Fig. 7 is a sectional view taken on line 7—7 of Fig. 4 and shows one end of the drums or drum structure including the manner of mounting the same.
Figure 8:
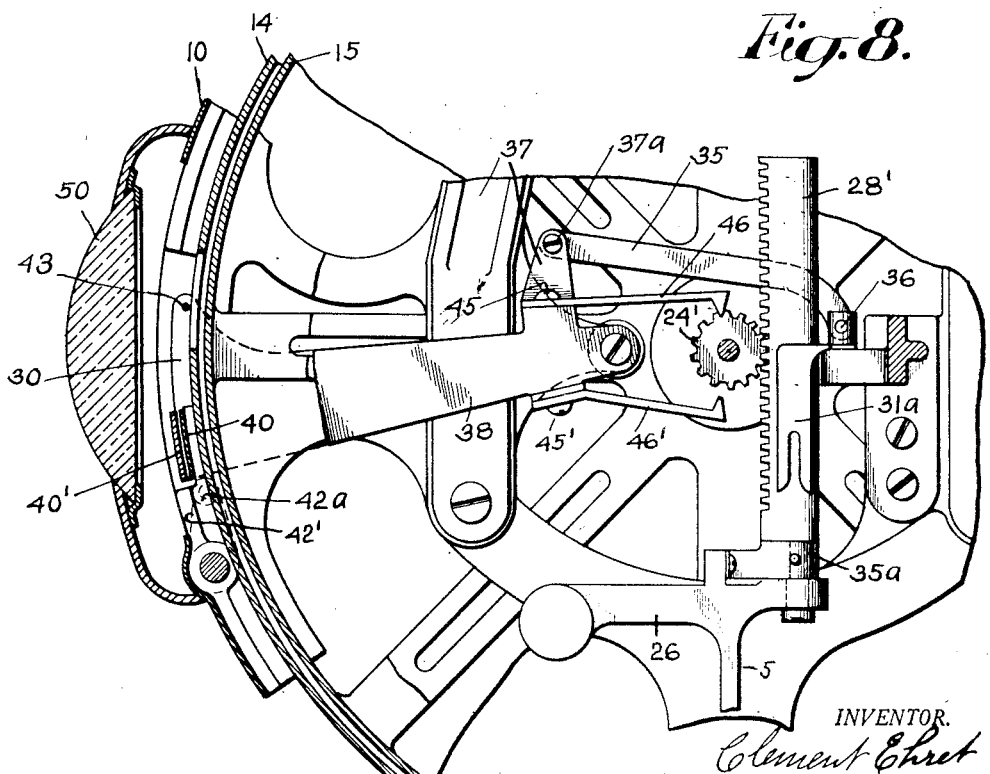
Fig. 8 is an enlarged view of the scale with the parts in weighing position.

Referring now to Fig. 4 mounted on the arm 38, as for instance by means of screws 45' are two locking members 46 and 46', the locking members being offset laterally so that one cooperates with pinion 24 and the other with pinion 24' (see Fig. 7). When the handle 41a is turned in a counter clockwise direction to bring the price per unit weight indicator 40' into position to be used with the inner drum 15 as shown in Fig. 8 the locking member 46 moves from the position of Fig. 4 to that of Fig. 8 and engages between the teeth of the pinion gear 24 holding same against rotation and simultaneously causing locking member 46' to move from the position of Fig. 4 to that of Fig. 8 becoming disengaged from between the teeth of pinion gear 24' so that the inner drum 15 may be revolved and the outer drum 14 held against rotation. The pinion 24 is, of course, hidden by pinion 24' as viewed in Figs. 4 and 8 but may be seen in Fig. 7.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention.

I claim:

1. In combination, in a weighing scale, a plurality of rotary drums, a weighing element, and means for selectively coupling at will either of the rotary drums with the weighing element.

2. In combination, in a weighing scale, a plurality of indicating charts, a weighing element and means for selectively coupling at will said charts with the weighing element.

3. In a weighing scale, in combination, a shaft, a weighing element, a plurality of rotary drums said drums being mounted one within the other on said shaft and means for selectively coupling at will said rotary drums with the weighing element.

4. In a weighing scale, in combination, a weighing element, a plurality of charts, a gear associated with each chart, a rack associated with each gear and coupled with the weighing element and means for selectively coupling at will said racks with said gears.

5. In a weighing scale, in combination, a plurality of charts, a plurality of indicators cooperating with said charts, a zero line member adapted to cooperate with said charts and indicators and means for selectively operatively combining said zero line member with one or another of said charts and indicators.

6. In a weighing scale, in combination, a plurality of charts, a plurality of indicators cooperating with said charts one of said indicators being fixed to the scale and the other indicator being movable in relation to its cooperating chart and means for rendering one of said indicators invisible when not in use.

7. In a weighing scale, a plurality of charts, actuating means for said charts, and means for selectively coupling the actuating means to said charts in any desired order.

8. In a weighing scale, a plurality of charts, actuating means for said charts, means for coupling the actuating means to either one of said charts, and means for rendering said coupling means ineffective after either one of the charts has been set in operation.

9. In a weighing scale, a plurality of charts, actuating means for said charts, means for selectively coupling the actuating means to either one of said charts in indeterminate order, and a device actuated by said coupling means for preventing movement of a non-selected chart.

10. In a weighing scale, including a chart, a plurality of chart actuating members, means for preventing movement of said members, and a device for selectively cooperatively coupling any one of said members to said means in any desired order.

11. In a weighing scale, a plurality of charts, a plurality of actuating members for said charts, means having a certain stroke of movement for driving said members, and means for coupling either one of said actuating members to said driving means for adapting the latter throughout its entire stroke to actuate either chart.

12. In a weighing scale, a plurality of charts, actuating means therefor, a plurality of latches for preventing movement of said charts, means other than the actuating means for selectively uncoupling said actuating means from one of said charts, and means for cooperatively associating one of said latches with said uncoupled chart upon uncoupling of the latter.

13. In a weighing scale, a plurality of charts, actuating means therefor, and means other than the actuating means for manually, selectively, coupling one of said charts at a time in any desired order to said actuating means.

14. In a weighing scale, a plurality of charts, a load controlled member, a plurality of elements for associating said member with any one of said charts, and means for adjusting said elements relative to said member for selecting the chart to be associated with said member.

15. In a weighing scale, a plurality of charts, a plurality of indicating devices, each device being adapted to cooperate with a different one of said charts and means for operatively associating only one of said indicating devices at a time with its cooperating chart.

16. In a weighing scale, a plurality of indicia-bearing charts, a plurality of devices, each device bearing indicia cooperating with indicia on a corresponding one of said charts, and means for rendering the indicia on one of said devices ineffective to cooperate with the indicia on the corresponding chart.

17. In a weighing scale, a plurality of charts, actuating means therefor, a plurality of indicating devices, each device being adapted to cooperate with a different one of said charts, means for coupling one of said charts to said actuating means for operation, and means for rendering the indicating device associated with the coupled chart operative to cooperate with said latter chart.

18. In a weighing scale, a plurality of charts, actuating means therefor, a plurality of indicating devices, each device being adapted to cooperate with a different one of said charts, means for coupling one of said charts to said actuating means for operation, means for preventing reading of the indicating device associated with an idle chart and a common operating member for said coupling means and said preventing means.

19. In a scale, a plurality of indicia-bearing charts, a zero line member, means for associating the zero line member with one of said charts, a device for obscuring indicia on the other chart, said device being operated by said means.

20. In a scale, a load-responsive member movable through a predetermined weight range, a plurality of charts each having indications corresponding to the complete weight range of said member, and means for coupling either of said charts to said member for the complete movement of the latter through said weight range.

21. In a scale such as defined in claim 20, said charts having their zero points initially offset relatively to each other and a zero line member movable by said coupling means into cooperation with the zero points of either chart.

In testimony whereof I hereto affix my signature.

CLEMENT EHRET.